United States Patent
Kobayashi et al.

(10) Patent No.: US 11,920,028 B2
(45) Date of Patent: Mar. 5, 2024

(54) CURABLE COMPOSITION AND METHOD FOR PRODUCING CURABLE COMPOSITION

(71) Applicant: Sunstar Engineering Inc., Osaka (JP)

(72) Inventors: Toshio Kobayashi, Osaka (JP); Takaaki Inoue, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 0 days.

(21) Appl. No.: 17/751,337

(22) Filed: May 23, 2022

(65) Prior Publication Data

US 2022/0389212 A1 Dec. 8, 2022

(30) Foreign Application Priority Data

Nov. 30, 2021 (JP) .................................. 2021-194779

(51) Int. Cl.
| | | |
|---|---|---|
| *C08K 5/16* | (2006.01) | |
| *C08K 5/25* | (2006.01) | |
| *C08K 5/3445* | (2006.01) | |
| *C08L 63/00* | (2006.01) | |
| *C09J 163/00* | (2006.01) | |
| *C08J 3/24* | (2006.01) | |
| *C08K 5/00* | (2006.01) | |

(52) U.S. Cl.
CPC ................ *C08L 63/00* (2013.01); *C08K 5/25* (2013.01); *C08K 5/3445* (2013.01); *C08J 3/24* (2013.01); *C08K 5/0025* (2013.01); *C08K 5/16* (2013.01); *C08L 2205/03* (2013.01); *C09J 163/00* (2013.01)

(58) Field of Classification Search
None
See application file for complete search history.

(56) References Cited

U.S. PATENT DOCUMENTS

| 6,812,065 B1 | 11/2004 | Kitamura |
| 10,836,881 B2 | 11/2020 | Lin et al. |
| 2005/0215667 A1 * | 9/2005 | Shimaoka ............... C08L 21/00 523/201 |
| 2006/0142403 A1 | 6/2006 | Sugiura et al. |

FOREIGN PATENT DOCUMENTS

| CN | 104327783 A | 2/2015 | |
| JP | S59-27976 A | 2/1984 | |
| JP | S60-115680 A | 6/1985 | |
| JP | H02-84477 A | 3/1990 | |
| JP | H04-145185 A | 5/1992 | |
| JP | 2000-345010 A | 12/2000 | |
| JP | 2005-272712 A | 10/2005 | |
| JP | 2007-246648 A | 9/2007 | |
| JP | 2016-145440 A | 8/2016 | |
| WO | 2004/108807 A1 | 12/2004 | |
| WO | WO-2006035709 A1 * | 4/2006 | ............ C09J 163/00 |
| WO | 2008/016122 A1 | 2/2008 | |
| WO | WO-2008016122 A1 * | 2/2008 | ......... C08G 59/4014 |

OTHER PUBLICATIONS

Office Action for Japanese Application No. 2021-194779 dated Nov. 8, 2022 and English machine translation.
Decision to Grant for Japanese Application No. 2021-194779 dated Feb. 7, 2023 and English Office Action summary.
Office Action for Japanese Application No. 2021-196265 dated Jan. 25, 2022 and English Office Action summary.
Partial supplementary European search report for corresponding European Application No. 22174835.3. dated Oct. 11, 2022.
International Preliminary Report on Patentability for related Application No. PCT/JP2021/019812 dated Nov. 21, 2023 (English translation).
International Search Report for related Application No. PCT/JP2021/019812 dated Aug. 3, 2021 (English translation).

\* cited by examiner

*Primary Examiner* — Richard A Huhn
(74) *Attorney, Agent, or Firm* — Renner, Otto, Boisselle & Sklar, LLP

(57) ABSTRACT

Disclosed is a curable composition comprising an elastomer (A), an epoxy resin (B) and a latent curing agent (C), wherein the latent curing agent (C) comprises a combination of two or more latent curing agents.

8 Claims, No Drawings

US 11,920,028 B2

CURABLE COMPOSITION AND METHOD FOR PRODUCING CURABLE COMPOSITION

CROSS-REFERENCE TO RELATED APPLICATIONS

This application claims priority under Article 4 of the Paris Convention based on PCT Application No. PCT/JP2021/019812 filed on May 25, 2021 in Japan and Japanese Patent Application No. 2021-194779 filed on Nov. 30, 2021 in Japan. This priority patent applications are incorporated herein by reference in their entirety.

BACKGROUND OF THE INVENTION

Field of the Invention

The present invention relates to a curable composition, and more particularly to a curable composition comprising an elastomer, an epoxy resin and a latent curing agent. The curable composition can be suitably used in, for example, adhesives for motor vehicles, and more specifically adhesives for body shop processes (processes called body shop or vehicle body processes) (e.g., structural adhesives, anti-flatter adhesives (or mastic adhesives), etc.).

Description of the Related Art

A white body of a motor vehicle is produced in a body shop process comprising press forming of a steel plate and assembling by welding. The white body is then coated in a coating process comprising electrodeposition coating, electrodeposition baking, coating and coating baking. An adhesive for body shop processes is an adhesive used to produce the white body produced in the body shop process. The adhesive for body shop processes is sometimes applied by hand, but is supplied from a pail or drum and is applied automatically without human intervention in recent years. The adhesive is required to have adhesive property to an oil surface (or oil wettability) and rust prevention and is also required to have a viscosity suitable for coating, anti-sagging property and so on, and the adhesive is a one-component thermosetting type adhesive, which is cured in an electrodeposition baking furnace during electrodeposition baking of the subsequent coating process.

For example, Patent Document 1 discloses a curable composition in which a composition comprising a synthetic rubber, a plasticizer, a filler and a core-shell type acrylic resin is mixed with a diluent and a tackifier which is a combination of an epoxy resin and a latent curing agent (see [claim 1] to [claim 3], [0043] [Table 1]). Patent Document 1 mentions that the curable composition does not require a polyvinyl chloride resin and is less harmful to the environment, and also exhibits excellent adhesion to an alloyed aluminum material etc., thus expanding the range of application of the alloyed aluminum material and exerting a significant effect of further reducing vehicle body weight (see [0008]).

Patent Document 2 discloses an anti-flatter adhesive for bonding vehicle body panels, comprising a synthetic rubber, polyvinyl chloride, a plasticizer and a filler in which 0.2 to 10% by weight of a titanium dioxide pigment is mixed (see claims, page 4, Table 1). Patent Document 2 mentions that, even if near-infrared heating is performed at a temperature of 140 to 270° C. within 3 minutes, there is no problem such as foaming or carbonization at all (see page 2, right column, lines 11-16).

Patent Document 3 discloses that a curable resin composition comprising a urethane-rubber modified epoxy resin and a latent curing agent has improved adhesion from low temperature to room temperature, and that a curable composition comprising a urethane-rubber modified epoxy resin, a blocked urethane and a latent curing agent is particularly excellent in tensile elongation at low temperature, together with adhesion from low temperature to normal temperature (see [0065] [Table 1] to [0067]).

[Patent Document 1] JP 2005-272712 A
[Patent Document 2] JP H02-84477 A
[Patent Document 3] JP 2007-246648 A

SUMMARY OF THE INVENTION

In recent years, there has been a growing demand for protection of the global environment, improvement of the working environment and lower energy consumption, and lower temperature is required for electrodeposition baking in the coating process. Therefore, an adhesive which is cured in an electrodeposition baking furnace of the coating process is also required to be cured at lower temperature (e.g., 130° C. to 165° C.). It is also required to maintain other properties such as hardness, elongation, shear strength, peel strength, shock absorbability and storage stability.

Patent Document 1 specifically mentions that a specimen is cured by holding at 170° C. for 20 minutes (see [0038] to [0039]).

Patent Document 2 does not disclose a specific curing temperature.

Patent Document 3 specifically mentions that a specimen is cured by holding at 180° C. for 30 minutes (see [0063] to [0064]).

All of Patent Documents 1-3 disclose curable compositions which cure at 170° C. or higher, and it is difficult to meet recent demands for lowering the temperature.

As a result of intensive study, the present inventors have found that a curable composition comprising an elastomer (A), an epoxy resin (B) and a latent curing agent (C), the latent curing agent (C) comprising a combination of two or more latent curing agents, is suitable for applications of adhesives for motor vehicles, and more specifically adhesives for body shop processes, and thus the present invention has been completed.

The present specification includes the following embodiments.

1. A curable composition comprising:
   an elastomer (A), an epoxy resin (B) and a latent curing agent (C), wherein
   the latent curing agent (C) comprises a combination of two or more latent curing agents.
2. The curable composition according to the above-mentioned item 1, wherein the elastomer (A) comprises at least one selected from a styrene-butadiene copolymer, a nitrile-butadiene copolymer, a butadiene polymer, an isoprene polymer, an ethylene-propylene-diene rubber, an acrylic (or a polymer comprising an acrylic structure) and a urethane (or a polymer comprising a urethane structure).
3. The curable composition according to the above-mentioned item 1, wherein at least a part of the elastomer (A) comprises a compound reacted in advance with the epoxy resin (B).

4. The curable composition according to any one of the above-mentioned items 1 to 3, further comprising a thermoplastic resin (E).

5. The curable composition according to the above-mentioned item 4, wherein the thermoplastic resin (E) comprises at least one selected from an acrylic resin, a PVC resin, a vinyl acetate resin and copolymers thereof.

6. The curable composition according to any one of the above-mentioned items 1 to 5, comprising a crosslinking agent (F) for elastomers.

7. The curable composition according to the above-mentioned item 6, wherein the crosslinking agent (F) for elastomers comprises at least one selected from sulfur and a peroxide.

8. The curable composition according to any one of the above-mentioned items 1 to 7, wherein the melting points of at least two latent curing (accelerating) agents comprised in the latent curing agent (C) differ by 10° C. or higher and 80° C. or lower.

9. The curable composition according to any one of the above-mentioned items 1 to 8, wherein at least one comprised in the latent curing agent (C) has a C10-C23 aliphatic alkane structure.

10. The curable composition according to any one of the above-mentioned items 1 to 9, wherein at least one comprised in the latent curing agent (C) is an aliphatic dihydazide.

11. The curable composition according to any one of the above-mentioned items 1 to 10, wherein at least one comprised in the latent curing agent (C) comprises a latent curing (accelerating) agent satisfying the formula (1):

[Chemical Formula 1]

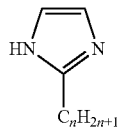

(1)

[wherein, in the formula (1), n=10 to 23].

12. The curable composition according to any one of the above-mentioned items 1 to 11, wherein at least one comprised in the latent curing agent (C) comprises dodecanediohydrazide.

13. The curable composition according to any one of the above-mentioned items 1 to 12, further comprising a filler (D).

14. The curable composition according to any one of the above-mentioned items 1 to 13, further comprising a plasticizer (G).

15. The curable composition according to any one of the above-mentioned items 1 to 14, further comprising a filler (D), a thermoplastic resin (E), a crosslinking agent (F) for elastomers, and a plasticizer (G).

16. A method for producing a curable composition comprising an elastomer (A), an epoxy resin (B) and a latent curing agent (C), the method comprising:
  mixing the elastomer (A), the epoxy resin (B) and the latent curing agent (C), and
  satisfying at least any one of the following (i) to (iii):
  (i) grinding at least a part of the latent curing agent (C) to make an average particle size thereof to be 25 μm or less in advance, and/or dispersing at least a part of the latent curing agent (C) in the epoxy resin (B) in advance;
  (ii) the curable composition further comprising a plasticizer (G), the process (ii) comprising:
  a step 1 of mixing and dissolving the elastomer (A) at least a part of which is solid, and at least a part of the plasticizer (G) or the epoxy resin (B) which is a liquid component to obtain a mixture 1 comprising the elastomer (A),
  a step 2 of mixing at least a part of the latent curing (accelerating) agent (C) and at least a part of the plasticizer (G) to obtain a mixture 2 comprising the latent curing (accelerating) agent (C), and
  a step 3 of mixing the mixture 1 obtained in the step 1, the mixture 2 obtained in the step 2, and other components of the curable composition other than the mixtures 1 and 2; and
  (iii) mixing a part or all of components of the curable composition to obtain an intermediate mixture of the curable composition, and stirring the intermediate mixture under reduced pressure to obtain the curable composition;
  wherein the stirring under reduced pressure comprises stirring under reduced pressure of 3 mmHg or higher and 150 mmHg or lower for 20 minutes or more, and no stirring under reduced pressure of lower than 3 mmHg, and stirring under reduced pressure of lower than 3 mmHg for 10 minutes or less.

17. The production method according to the above-mentioned item 16, wherein, in the case of (ii), the mixing of the elastomer (A) and the plasticizer (G) comprises the addition of the plasticizer (G) in divided portions to the elastomer (A) passed through the mixing roll.

18. The production method according to the above-mentioned items 16 or 17, wherein the stirring comprises use of a twin-screw mixer, a planetary mixer or a sigma mixer.

19. The production method according to any one of the above-mentioned items 16 to 18, wherein, in the case of (iii), the lower limit of the vacuum degree (or degree of evacuation) comprises 1 mmHg or higher.

The curable composition according to an embodiment of the present invention comprises an elastomer (A), an epoxy resin (B) and a latent curing agent (C), the latent curing agent (C) comprising a combination of two or more latent curing agents, and the curable composition can be suitably used in applications of adhesives for motor vehicles, and more specifically adhesives for body shop processes.

DETAILED DESCRIPTION OF THE EMBODIMENT

The present invention provides, in one aspect, a novel curable composition comprising:
an elastomer (A), an epoxy resin (B) and a latent curing agent (C), and
the latent curing agent (C) comprises a combination of two or more latent curing agents.

The curable composition according to an embodiment of the present invention comprises an elastomer (A), an epoxy resin (B) and a latent curing agent (C).

As used herein, the elastomer (A) means a polymer having rubber elasticity and is usually a polymer called an elastomer, and includes a thermosetting elastomer and a thermoplastic elastomer, and the elastomer is not particularly limited as long as the objective curable composition of the present invention can be obtained.

Examples of the elastomer (A) include a styrene-butadiene copolymer, a nitrile-butadiene copolymer, a butadiene polymer, an isoprene polymer, an ethylene-propylene-diene polymer, an acrylic polymer and a polymer having a urethane bond.

The curable composition includes, as the elastomer (A), preferably at least one selected from a styrene-butadiene copolymer (styrene-butadiene rubber), a nitrile-butadiene copolymer, a butadiene polymer (butadiene rubber), an isoprene polymer, an ethylene-propylene-diene polymer, an acrylic polymer and a polymer having a urethane bond, and more preferably at least one selected from a styrene-butadiene copolymer (styrene-butadiene rubber) and a butadiene polymer (butadiene rubber).

In the embodiment of the present invention, at least a part of the elastomer (A) may include a compound reacted in advance with the epoxy resin (B). In this case, the affinity (or compatibility) between the elastomer and the epoxy resin can be further improved, leading to further improvement in overall physical properties of the curable composition.

It is possible to use, as the elastomer (A), commercially available products.

Examples of the commercially available products include SBR1009 (trade name) manufactured by ISP Japan, Ltd., SB-1009 (trade name) manufactured by Nitriflex, SBR1009 (trade name) manufactured by Lion Elastomers, Nipol DN214 (trade name) manufactured by Zeon Corporation, BR1220 (trade name) manufactured by Zeon Corporation, N230S (trade name) manufactured by JSR Corporation and the like.

The elastomer (A) can be used alone or in combination.

The curable composition according to the embodiment of the present invention may include the elastomer (A) in an amount of, for example, 2 to 20 parts by mass, preferably 3 to 15 parts by mass, more preferably 4 to 10 parts by mass, and more preferably 5 to 9 parts by mass, based on 100 parts by mass of the curable composition.

When the curable composition according to the embodiment of the present invention includes the elastomer (A) in an amount of 2 to 20 parts by mass based on 100 parts by mass of the curable composition, more appropriate curability can be obtained, more satisfactory workability due to more appropriate viscosity can be obtained, and the hardness of the cured product can be adjusted more appropriately.

The curable composition according to the embodiment of the present invention can further comprises a thermoplastic resin (E).

As used herein, the thermoplastic resin (E) is solid and is a powdery or particulate polymer at normal temperature, and exists in a dispersed state, i.e. a sol state, in liquid components such as an epoxy resin and a plasticizer (when used), and the thermoplastic resin refers to a resin which turns into a state of being swollen in the liquid components such as an epoxy resin and a plasticizer when heated (e.g., 80° C. or higher) and which solidifies when cooled. There are no particular limitation on the thermoplastic resin as long as the objective curable composition of the present invention can be obtained, excluding the above elastomer (A). When the curable composition according to the embodiment of the present invention further includes a thermoplastic resin (E), the curability can be further improved, and the physical properties can be more easily adjusted by changing the amount of the thermoplastic resin (E) added.

Examples of the thermoplastic resin (E) include an acrylic resin, a vinyl chloride (PVC) resin, a vinyl acetate (vinyl acetate) resin, and copolymers thereof.

The thermoplastic resin (E) is preferably a thermoplastic resin which has a polar group and a non-polar group, and has a polarizable structure, for example, at least one selected from an acrylic resin, a polyvinyl chloride (PVC) resin, a vinyl acetate resin, and copolymers thereof. Examples of the thermoplastic resin further include combinations of an acrylic resin, a polyvinyl chloride (PVC) resin, a vinyl acetate resin, and copolymers thereof. A combination of an acrylic resin and a polyvinyl chloride resin, a combination of an acrylic resin and a vinyl acetate resin and a combination of a polyvinyl chloride resin and a vinyl acetate resin are preferable.

It is preferable that the thermoplastic resin (E) may further comprise a resin (e.g., acrylic resin) which may have a core-shell structure and exists in a dispersed state at normal temperature, and is dissolvable during heating.

The thermoplastic resin (E) is preferably in a form of particles. The average particle size of the thermoplastic resin (E) is preferably 0.01 to 100 μm, more preferably 0.05 to 10 μm, still more preferably 0.1 to 5 μm, and yet more preferably 0.2 to 2 μm.

When the thermoplastic resin (E) is in a form of particles, the thermoplastic resin can be plasticized more easily when heated and mixed more evenly with the elastomer (A) and the epoxy resin (B) etc.

The average particle size of the thermoplastic resin can be measured by the laser particle size distribution measurement method using SALD-200V ER (trade name) manufactured by Shimadzu Corporation.

It is possible to use, as the thermoplastic resin (E), commercially available products.

Examples thereof include LP-3106 (trade name) manufactured by MITSUBISHI RAYON CO., LTD., LP-3102 (trade name) manufactured by MITSUBISHI RAYON CO., LTD., LP-3108 (trade name) manufactured by MITSUBISHI RAYON CO., LTD., LP-3109 (trade name) manufactured by MITSUBISHI RAYON CO., LTD., etc.; ZEFIAC F351 (trade name) manufactured by Aica Kogyo Company, Limited., ZEFIAC F351 (trade name) manufactured by Aica Kogyo Company, Limited, etc.; and PSH-10 (trade name) manufactured by KANEKA CORPORATION, PCH-72 (trade name) manufactured by KANEKA CORPORATION, PSH-24 (trade name) manufactured by KANEKA CORPORATION, PBM-6 (trade name) manufactured by KANEKA CORPORATION.

The thermoplastic resin (E) can be used alone or in combination.

The curable composition according to the embodiment of the present invention may include the thermoplastic resin (E) in an amount of, for example, 0.2 to 20 parts by mass, preferably 0.4 to 15 parts by mass, more preferably 1 to 10 parts by mass, and still more preferably 2 to 9 parts by mass, based on 100 parts by mass of the curable composition.

When the curable composition according to the embodiment of the present invention include the thermoplastic resin (E) in the amount of 0.2 to 20 parts by mass based on 100 parts by mass of the curable composition, more appropriate physical properties can be obtained, and it is possible to exert an advantageous effect of exhibiting more excellent balance between the curability and the storage stability.

The curable composition according to the embodiment of the present invention can include a crosslinking agent (F) for elastomers.

As used herein, the crosslinking agent (F) for elastomers refers to a substance which is capable of crosslinking the elastomer (A) to adjust the rubbery properties of the elastomer (A) (e.g. capable of making it harder), and is not particularly limited as long as the objective curable composition of the present invention can be obtained.

When the curable composition according to the embodiment of the present invention includes the crosslinking agent (F) for elastomers, it is possible to exert an advantageous effect capable of improving the curability and increasing the hardness, and capable of adjusting the hardness by adjusting the amount.

Examples of the crosslinking agent (F) for elastomers include sulfur, a peroxide, a quinone-based compound and the like.

The crosslinking agent (F) for elastomers includes preferably at least one selected from sulfur, a peroxide and a quinone-based compound, and more preferably at least one selected from a peroxide and a quinone-based compound.

It is possible to use, as the crosslinking agent (F) for elastomers, commercially available products.

Examples of the commercially available products include peroxides such as PERHEXA V (trade name) (n-butyl 4,4-di(t-butylperoxy)valerate) manufactured by NOF CORPORATION and PERHEXA C (1,1-di(t-butylperoxy)cyclohexane) (trade name) manufactured by NOF CORPORATION; and quinone-based compounds such as (p-quinonedioxime) VULNOC GM-P (trade name) and O,O'-dibenzoyl-p-quinonedioxime) VULNOC DGM (trade name) manufactured by OUCHI SHINKO CHEMICAL INDUSTRIAL CO., LTD.

The crosslinking agent (F) for elastomers can be used alone or in combination thereof.

The curable composition according to the embodiment of the present invention may include the crosslinking agent (F) for elastomers in an amount of, for example, 0.03 to 5 parts by mass, preferably 0.08 to 4 parts by mass, and more preferably 0.1 to 3 parts by mass, based on 100 parts by mass of the curable composition.

When the curable composition according to the embodiment of the present invention includes the crosslinking agent (F) of the elastomer in the amount of 0.3 to 5 parts by mass based on 100 parts by mass of the curable composition, a cured product having more appropriate physical properties (e.g., hardness) can be obtained more easily.

The curable composition according to the embodiment of the present invention include an epoxy resin (B).

As used herein, the "epoxy resin" refers to a compound which has two or more epoxy groups in the molecule and is generally called an epoxy resin, and is not particularly limited as long as the objective curable composition of the present invention can be obtained. Examples of the epoxy resin include a glycidyl ether type epoxy resin, a glycidyl amine type epoxy resin, a glycidyl ester type epoxy resin and the like.

Examples of the epoxy resin included in the curable composition according to the embodiment of the present invention further include:
  bisphenol type epoxy resins such as bisphenol A, bisphenol F, brominated bisphenol A, diglycidyl ether of bisphenol AD and diglycidyl ether of an alkylene oxide adduct of bisphenol A, and alicyclic epoxy resins obtained by hydrogenation of aromatic rings included in these epoxy resins;
  diglycidyl ether type epoxy resins having one aromatic ring, such as catechol, resorcinol and hydroquinone;
  diglycidyl ester type epoxy resins based on dimer acid, phthalic acid and hydrogenated phthalic acid;
  polyfunctional novolak type epoxy resins obtained by multinucleation of bisphenol A or bisphenol F;
  acrylonitrile-butadiene copolymer-modified epoxy resins produced by mixing a carboxyl-terminated butadiene-acrylonitrile copolymer rubber with a bisphenol type epoxy resin at a mass ratio of 1:5 to 4:1, and preferably 1:3 to 3:2, followed by reaction at a temperature 80 to 180° C.;
  alkylene oxide-modified glycidyl ether type epoxy resins obtained by reacting polyhydroxy compounds [e.g., polyalkylene glycols (polyethylene glycol, polypropylene glycol, polyethylene-propylene glycol, etc.); and aliphatic polyhydric hydroxy compounds such as hexylene glycol, butylene glycol, propylene glycol, ethylene glycol, neopentyl glycol, triethylene glycol, pentanediol, hexanetriol and glycerol] with epihalohydrin; and
  urethane-modified epoxy resins obtained by reacting a polyurethane prepolymer in which a polyisocyanate is added to an end of a polyalkylene glycol with a hydroxyl group of an epoxy resin (mixing ratio is 10:90 to 50:50), and acrylic-modified epoxy resins obtained by reacting carboxyl groups on a surface of acrylic rubber particles with an epoxy resin (mixing ratio is 10:90 to 50:50).

It is possible to use, as the epoxy resin, commercially available products. Examples of the commercially available products include "jER (registered trademark) 828" manufactured by Mitsubishi Chemical Corporation, "ADEKA RESIN EPR-4023", "ADEKA GLYCYLOL ED-506", "ADEKA RESIN EPU-73B" and "ADEKA RESIN EPU-78-11" manufactured by ADEKA CORPORATION, "KANE ACE MX-257" manufactured by KANEKA CORPORATION, "HBE-100" manufactured by New Japan Chemical Co., Ltd. and the like.

The epoxy resin can be used alone or in combination.

The curable composition according to the embodiment of the present invention may include the epoxy resin (B) in an amount of, for example, 0.1 part by mass or more, preferably 0.2 part by mass or more, preferably 0.3 part by mass or more, more preferably 0.5 part by mass or more, 1.0 parts by mass or more, and 1.5 parts by mass or more, based on 100 parts by mass of the curable composition.

The curable composition according to the embodiment of the present invention may include the epoxy resin (B) in an amount of, for example, 50 parts by mass or less, 10 parts by mass or less, 8 parts by mass or more, more preferably 5 parts by mass or less, and more preferably 3 parts by mass or less, based on 100 parts by mass of the curable composition.

The curable composition according to the embodiment of the present invention may include the epoxy resin (B) in an amount of, for example, 0.1 to 50 parts by mass based on 100 parts by mass of the curable composition, and in consideration of the aluminum alloy plate adhesion during curing at lower temperature (150° C.), the amount of the epoxy resin (B) is preferably 0.2 to 10 parts by mass, more preferably 0.3 to 5 parts by mass, and still more preferably 0.5 to 3 parts by mass. In consideration of the impact strength, the amount of the epoxy resin (B) is preferably 10 to 45 parts by mass, more preferably 20 to 40 parts by mass, and still more preferably 25 to 35 parts by mass.

When the curable composition according to the embodiment of the present invention includes the epoxy resin (B) in an amount of 0.1 to 50 parts by mass based on 100 parts by mass of the curable composition, the adhesion to a substrate, for example, an aluminum alloy plate is more excellent.

When the curable composition according to the embodiment of the present invention includes the epoxy resin (B) in an amount of 0.2 to 10 parts by mass based on 100 parts by mass of the curable composition, the adhesion to an aluminum alloy plate during curing at low temperature (150° C.) is more excellent.

The curable composition according to the embodiment of the present invention comprises a latent curing agent (C), and the latent curing agent (C) comprises a combination of two or more latent curing agents.

As used herein, the "latent curing agent" is a curing agent for epoxy resins and refers to a compound which does not substantially function as a curing agent at room temperature, but functions as a curing agent when heated, for example, to 165° C., and preferably 150° C., and is not particularly limited as long as the objective curable composition of the present invention can be obtained.

Specific examples of the latent curing agent include dicyandiamide; dihydrazide compounds such as adipic acid dihydrazide, sebacic acid dihydrazide, isophthalic acid dihydrazide, dodecanediohydrazide, 1,3-bis(hydrazinocarboethyl)-5-isopropylhydantoin, eicosane diacid dihydrazide, hydroquinone diglycolic acid dihydrazide, resorcinol diglycolic acid dihydrazide and 4,4'-ethylidene bisphenol diglycolic acid dihydrazide; 4,4'-diaminodiphenyl sulfone; imidazole compounds such as imidazole, 2-n-heptadecylimidazole and 2-undecylimidazole; melamine; triazine compounds such as 2,4-diamino-6-(2'-methylimidazolyl-(1'))-ethyl-o-triazine; benzoguanamine; dialkylurea compounds such as N,N'-dialkylurea compound and N,N-dialkylurea (N,N-dimethyl-N'-(3,4-dichlorophenyl)urea etc.); N,N'-dialkylthiourea compounds; polyamines such as diaminodiphenylmethane, diaminobiphenyl, diaminophenyl, phenylenediamine, tolylenediamine, dodecanediamine, decanediamine, octanediamine, tetradecanediamine, hexadecanediamine, polyoxypropylenediamine and hydrazide-based polyamine; and guanidine derivatives such as cyanoguanidine.

It is possible to use, as the latent curing agent, commercially available products. Examples of the commercially available products include CG-NA (trade name) manufactured by Air Products Limited., EH-4030s (trade name) manufactured by ADEKA CORPORATION, ADH (trade name) manufactured by Otsuka Chemical Co., Ltd., EH3731s (trade name) manufactured by ADEKA CORPORATION, Dyhard UR200 (trade name) manufactured by AlzChem, DDH (trade name) manufactured by Otsuka Chemical Co., Ltd. and the like.

In the embodiment of the present invention, the melting points of at least two latent curing (accelerating) agents included in the latent curing agent (C) differ by preferably 10 to 80° C., more preferably 13 to 50° C., and still more preferably 15 to 25° C.

When the melting points of at least two latent curing (accelerating) agents included in the latent curing agent (C) differ by 10 to 80° C., curability, physical properties (e.g., adhesive strength, tensile strength, elongation, etc.) and storage stability are more excellent and well-balanced.

In the embodiment of the present invention, at least one included in the latent curing agent (C) includes preferably at least one selected from dicyandiamide; dihydrazide compounds; imidazole compounds; triazine compounds; and dialkylurea compounds.

When at least one included in the latent curing agent (C) includes at least one selected from dicyandiamide; dihydrazide compounds; imidazole compounds; triazine compounds; and dialkylurea compounds, the storage stability and the adhesion are more excellent.

In the embodiment of the present invention, at least one included in the latent curing agent (C) has preferably a C10-C23 aliphatic alkane structure (or aliphatic alkyl group), more preferably a C10-C18 aliphatic alkane structure, and still more preferably a C12-C17 aliphatic alkane structure.

When at least one included in the latent curing agent (C) has a C10-C23 aliphatic alkane structure, the low-temperature adhesion is more excellent.

In the embodiment of the present invention, at least one included in the latent curing agent (C) has preferably a C10-C23 aliphatic alkylene structure (or aliphatic alkylene group), and more preferably C10-C18 aliphatic alkylene structure.

In the embodiment of the present invention, at least one included in the latent curing agent (C) includes preferably a dihydrazide compound, more preferably an aliphatic dihydazide compound, and still more preferably an aliphatic dicarboxylic acid dihydrazide. The aliphatic dicarboxylic acid dihydrazide has preferably a C10-C23 aliphatic alkylene structure, more preferably a C10-C18 aliphatic alkylene structure, and still more preferably dodecanediohydrazide.

When at least one included in the latent curing agent (C) includes a dihydrazide compound, the low-temperature adhesion is more excellent.

In the embodiment of the present invention, at least one included in the latent curing agent (C) includes preferably a latent curing (accelerating) agent represented by the formula (1):

[Chemical Formula 2]

[wherein, in the formula (1), n=10 to 23].

When at least one included in the latent curing agent (C) includes a latent curing (accelerating) agent represented by the formula (1), it is possible to exert an advantageous effect of exhibiting more excellent low-temperature curability.

The curable composition according to the embodiment of the present invention may include the latent curing agent (C) in an amount of, for example, 0.05 to 2.5 parts by mass, preferably 0.07 to 2.0 parts by mass, more preferably 0.1 to 1.6 parts by mass, and still more preferably 0.2 to 1.0 parts by mass, based on 100 parts by mass of the curable composition.

When the curable composition according to the embodiment of the present invention includes the latent curing agent (C) in an amount of 0.05 to 2.5 parts by mass based on 100 parts by mass of the curable composition, the curability and the storage stability are excellent and well-balanced.

The curable composition according to the embodiment of the present invention can further comprise a filler (D).

As used herein, the filler is a compound which can increase the amount of the curable composition according to the embodiment of the present invention and impart a certain degree of strength to a film formed from the curable composition, and is not particularly limited as long as it can contribute to viscosity adjustment or weight reduction, and the objective curable composition of the present invention can be obtained.

Examples of the filler include carbonates and sulfates of alkaline earth metals, such as calcium carbonate (heavy calcium carbonate, precipitated calcium carbonate, surface-treated calcium carbonate, etc.), magnesium carbonate and barium sulfate; mica, graphite, talc, clay, glass flakes (glass beads), vermiculite, kaolinite, wollastonite (needle-shaped calcium metasilicate), silica, diatomaceous earth, gypsum, cement, converter slag, Shirasu, zeolite, cellulose powder, powdered rubber, xonotlite, potassium titanate, bentonite, aluminum nitride, silicon nitride, zinc white, titanium oxide, alumina, zinc oxide, iron oxide, magnesium oxide, titanium oxide, magnesium hydroxide, aluminum hydroxide and calcium silicate; calcium carbonate whiskers (needle-shaped calcium carbonate), ceramic short fibers or whiskers thereof, rock wool short fibers, glass fiber short fibers, potassium titanate short fibers, calcium silicate short fibers, aluminum silicate, carbon fiber short fibers, aramid fiber short fibers, mineral fibers such as sepiolite; fibrous fillers such as various whiskers; hollow fillers such as glass balloons, silica balloons, resin balloons and carbon inorganic hollow spheres; organic hollow fillers such as plastic balloons made of organic synthetic resins such as polyvinylidene chloride and polyacrylonitrile; and metallic fillers such as aluminum fillers.

The curable composition according to the embodiment of the present invention may include the filler (D) in an amount of, for example, 20 to 80 parts by mass, preferably 25 to 70 parts by mass, more preferably 30 to 60 parts by mass, and still more preferably 35 to 55 parts by mass, based on 100 parts by mass the curable composition.

When the curable composition according to the embodiment of the present invention includes the filler (D) in an amount of 20 to 80 parts by mass based on 100 parts by mass of the curable composition, the workability can be further improved.

The curable composition according to the embodiment of the present invention can further comprise a plasticizer (G).

As used herein, the plasticizer (G) can increase the plasticity to soften, and is not particularly limited as long as the objective curable composition can be obtained.

Examples of the plasticizers include alkyl benzyl phthalates such as butyl benzyl phthalate (BBP), octyl benzyl phthalate (OBP) and isononyl benzyl phthalate; dimethyl cyclohexyl phthalate (DMCHP); phthalic acid polyester; benzoic acid ester; dialkyl phthalates such as diisononyl phthalate (DINP), dioctyl phthalate (DOP), dimethyl phthalate (DMP), diethyl phthalate (DEP), dibutyl phthalate (DBP), diheptyl phthalate (DHP), dinonyl phthalate (DNP), didecyl phthalate (DDP), di-normal octyl phthalate (DnOP), diisodecyl phthalate (DIDP) and bis-2-ethylhexyl phthalate (DEHP); dialkyl cyclohexane dicarboxylates such as diisononyl cyclohexane dicarboxylate; and trimellitic acid triester such as trioctyl trimellitate (TOTM), trioctyl trimellitate (TOTN), triisooctyl trimellitate and triisodecyl trimellitate.

The plasticizer includes preferably a phthalic acid diester, and the phthalic acid diester includes more preferably an alkylbenzyl phthalate and/or a dialkyl phthalate.

When the plasticizer include the phthalic acid diester, it is preferable that the storage stability is excellent while having appropriate curability, and when the plasticizer includes the alkyl benzyl phthalate and/or the dialkyl phthalate, it is more preferable that the curability is enhanced.

The curable composition according to the embodiment of the present invention can include the plasticizer in an amount of, for example, 5 to 60 parts by mass, 10 to 55 parts by mass, more preferably 15 to 50 parts by mass, and still more preferably 20 to 40 parts by mass, based on 100 parts by mass the curable composition.

The curable composition according to the embodiment of the present invention can comprise appropriately other components. Examples of the other components include usual curing agents (excluding the above latent curing agents), diluents, surfactants and other additives.

In the embodiment of the present invention, the curing agent is a compound which has no curing action at normal temperature but exhibits a curing action at a certain temperature, and is not particularly limited as long as the objective curable composition of the present invention can be obtained, excluding the above latent curing agents.

In the embodiment of the present invention, the diluent can impart fluidity to the curable composition according to the embodiment of the present invention, and is not particularly limited as long as the objective curable composition of the present invention can be obtained.

Examples of the diluent include hydrocarbon-based solvents such as paraffin-based solvents, isoparaffin-based solvents, naphthene-based solvents and aromatic solvents.

In the embodiment of the present invention, examples of other additives include desiccants (calcium oxide, molecular sieves, etc.), thixotropy-imparting agents (organic bentonite, fumed silica, aluminum stearate, metal soaps, castor oil derivatives, etc.), stabilizers [2,6-di-t-butyl-4-methylphenol, 2,2-methylene-bis(4-methyl-6-t-butylphenol), nickel dibutyldithiocarbamate, etc.], curing accelerators (dibutyltin dilaurate, lead octylate, bismuth octylate, etc.), coupling agents such as silane or titanium coupling agents, foaming agents and so on. Other additives can be appropriately used without being particularly limited as long as the objective curable composition of the present invention can be obtained The volume change rate of the curable composition according to the embodiment of the present invention is preferably 80 to 200%, preferably 90 to 180%, preferably 95 to 150%, and more preferably 96 to 120%.

When the volume change rate of the curable composition according to the embodiment of the present invention is 80 to 200%, it is possible to exert an advantageous effect that the cured product of the curable composition is less likely to cause cohesive fracture because of small volume change rate, and thus the adhesive force can be further improved.

The curable composition according to the embodiment of the present invention can include a filler (D), a thermoplastic resin (E), a crosslinking agent (F) for elastomers, and a plasticizer (G), in addition to the elastomer (A), the epoxy resin (B) and the latent curing agent (C). When the curable composition according to the embodiment of the present invention further includes the filler (D), the thermoplastic resin (E), the crosslinking agent (F) for elastomers and the plasticizer (G), it is possible to exert an advantageous effect capable of adjusting the adhesion and physical properties according to the intended use.

When the curable composition according to the embodiment of the present invention further comprises the filler (D), the thermoplastic resin (E), the crosslinking agent (F) for elastomers and the plasticizer (G), since a reaction of the epoxy resin (B) with the latent curing agent (C) (e.g., amine compound) progresses competitively together with a sol-gel reaction of the thermoplastic resin (E) with the plasticizer (G) and a reaction of the elastomer (A) with the crosslinking agent (F) for elastomers, in the reaction of the epoxy resin (B) contributing to the adhesion, at least one included in the latent curing agent (C) includes preferably at least one selected from a dihydrazide compound and an imidazole compound, and the latent curing agent (C) includes preferably both a dihydrazide compound and an imidazole compound. In this case, it is possible to exert an advantageous effect that the adhesion performance is excellent while the low-temperature curability and storage stability are well-balanced.

When the curable composition according to the embodiment of the present invention further includes the filler (D), the thermoplastic resin (E), the crosslinking agent (F) for elastomers and the plasticizer (G), since a reaction of the epoxy resin (B) with the latent curing agent (C) (e.g., amine compound) progresses competitively together with a sol-gel reaction of the thermoplastic resin (E) with the plasticizer (G) and a reaction of the elastomer (A) with the crosslinking agent (F) for elastomers, in the reaction of the epoxy resin (B) contributing to the adhesion, at least one included in the latent curing agent (C) has preferably a C10-C23 aliphatic alkane structure. In this case, the low-temperature adhesion is more excellent and higher cohesive fracture rate can be maintained even at low temperature (e.g., 150° C.). This effect is observed when the thermoplastic resin (E) and the plasticizer (G) are included and when the elastomer (A) and the elastomer crosslinking agent (F) for elastomers are included. It is considered that the effect was exerted by an interaction of a C10-C23 alkane structure of the latent curing agent (C) with the thermoplastic resin (E) (for example, an acrylic structure) and/or the elastomer (A).

When the curable composition according to the embodiment of the present invention further comprises the filler (D), the thermoplastic resin (E), the crosslinking agent (F) for elastomers and the plasticizer (G), at least one included in the latent curing agent (C) includes preferably a latent curing agent represented by the above formula (1). In this case, it is possible to exert an advantageous effect that the adhesion performance is excellent while the low-temperature curability and storage stability are well-balanced.

The curable composition according to the embodiment of the present invention can be produced by mixing the above components.

The present invention can provide, in another aspect, a method for producing a curable composition comprising an elastomer (A), an epoxy resin (B) and a latent curing agent (C), the method comprising:
  mixing the elastomer (A), the epoxy resin (B) and the latent curing agent (C), and
  satisfying at least any one of the following (i) to (iii):
  (i) grinding at least a part of the latent curing agent (C) to make an average particle size thereof to be 25 μm or less in advance, and/or dispersing at least a part of the latent curing agent (C) in the epoxy resin (B) in advance;
  (ii) the curable composition further being able to comprise a plasticizer (G), the process (ii) comprising:
  a step 1 of mixing and dissolving the elastomer (A) at least a part of which is solid, and at least a part of the plasticizer (G) or the epoxy resin (B) which is a liquid component to obtain a mixture 1 containing the elastomer (A),
  a step 2 of mixing at least a part of the latent curing (accelerating) agent (C) and at least a part of the plasticizer (G) to obtain a mixture 2 containing the latent curing (accelerating) agent (C), and
  a step 3 of mixing the mixture 1 obtained in the step 1, the mixture 2 obtained in the step 2, and other components of the curable composition other than the mixtures 1 and 2 (e.g., a filler (D), a thermoplastic resin (E), a crosslinking agent (F) for elastomers and/or the plasticizer (G));
  (iii) mixing a part or all of components of the curable composition to obtain an intermediate mixture of the curable composition, and stirring the intermediate mixture under reduced pressure to obtain the curable composition;
  wherein the stirring under the reduced pressure includes stirring under reduced pressure of 3 mmHg or higher and 150 mmHg or lower for 20 minutes or more, and no stirring under reduced pressure of lower than 3 mmHg and stirring under reduced pressure of lower than 3 mmHg for 10 minutes or less (i.e., the pressure may be reduced to less than 3 mmHg, and in that case, the stirring time is 10 minutes or less, and the stirring time can be 0 minute).

The present invention can provide, as an embodiment of a method for producing a curable composition, the method for producing a curable composition comprising an elastomer (A), an epoxy resin (B) and a latent curing agent (C), the method comprising:
  mixing the elastomer (A), the epoxy resin (B) and the latent curing agent (C), and
  (i) grinding at least a part of the latent curing agent (C) to make an average particle size thereof to be 25 μm or less in advance, and/or dispersing at least a part of the latent curing agent (C) in the epoxy resin (B) in advance;

There is no particular limitation on the apparatus and the method for mixing the elastomer (A), the epoxy resin (B) and the latent curing agent (C) as long as the objective curable composition of the present invention can be produced.

It is possible to use, as the mixing apparatus, for example, a biaxial mixer, a planetary mixer, a sigma mixer, a kneader, an attritor, a glen mill, a roll, a dissolver and the like.

It is more preferable to use a twin-screw mixer, a planetary mixer or a sigma mixer for mixing. The use of a twin-screw mixer, planetary mixer or sigma mixer enables more efficient dispersion of high-viscosity materials.

Furthermore, the mixing can be performed using a container in which mixing can be performed, for example in a tank, a container or the like.

The method for producing a curable composition according to an embodiment of the present invention can include the above process (i).

When the production method according to the embodiment of the present invention includes the process (i), the latent curing agent (C) can be dispersed more uniformly in the curable composition, and thus the curable composition having more satisfactory properties can be produced.

There is no particular limitation on the apparatus and the method for grinding the latent curing agent (C) to make an average particle size thereof to be 25 μm or less as long as the objective curable composition of the present invention can be produced.

It is possible to use, as the grinding apparatus and the method, various grinding apparatuses and methods, and specifically, it is possible to use, for example, KJ400 (trade name) manufactured by Kurimoto, Ltd.

The average particle size of the latent curing agent (C) can be measured by a laser particle size distribution measurement method, and specifically, it can be measured, for example, using a SALD-200V ER (trade name) manufactured by Shimadzu Corporation.

The average particle size is preferably 50 µm or less, more preferably 30 µm or less, and still more preferably 25 µm or less.

When the latent curing agent (C) is ground into an average particle size of 25 µm or less in advance, the adhesive strength can be more stable.

Furthermore, at least a part of the latent curing agent (C) may be dispersed in the epoxy resin (B) in advance. The latent curing agent (C) is dispersed preferably in the epoxy resin (B) in a proportion of 25%, more preferably 50%, and still more preferable the entire latent curing agent (100%).

When at least a part of the latent curing agent (C) is dispersed in the epoxy resin (B) in advance, the adhesive strength can be more stable.

The present invention can provide, as an embodiment of a method for producing a curable composition, a method for producing a curable composition comprising an elastomer (A), an epoxy resin (B) and a latent curing agent (C), the method comprising:

mixing the elastomer (A), the epoxy resin (B) and the latent curing agent (C), and the following steps 1 to 3 (in the case of (ii)):

(ii) a step 1 of mixing and dissolving the elastomer (A) at least a part of which is solid, and at least a part of a plasticizer (G) or the epoxy resin (B) which is a liquid component to obtain a mixture 1 containing the elastomer (A), a step 2 of mixing at least a part of the latent curing (accelerating) agent (C) and at least a part of the plasticizer (G) to obtain a mixture 2 containing the latent curing (accelerating) agent (C), and a step 3 of mixing the mixture 1 obtained in the step 1 with the mixture 2 obtained in the step 2 and other components of the curable composition other than the mixtures 1 and 2 (e.g., a filler (D), a thermoplastic resin (E), a crosslinking agent (F) for elastomers and/or the plasticizer (G)).

The method for producing a curable composition according to the embodiment of the present invention can comprise the above process (ii). In this case, the curable composition according to the embodiment of the present invention can further comprise the plasticizer (G), and such a method for producing a curable composition can be provided.

In the above step 1, it is preferable to use a method in which a cohesive force of the elastomer (A) is decreased by adding a part of the filler (D), thus promoting the dissolution of the elastomer (A). The charging order in the step 3 may be changed appropriately.

There is no particular limitation on the stirring apparatus and method, and the mixing apparatus and method in the above steps 1 to 3 as long as the objective curable composition of the present invention can be produced.

When the production method according to the embodiment of the present invention includes the above process (ii), it is possible to exert an advantageous effect of improving the dispersibility, making the mixing more efficient, shortening the process time and improving the adhesive strength.

When the dispersibility of the elastomer (A) is more improved, the state of mixing with other components (e.g., the epoxy resin (B), the latent curing agent (C), the thermoplastic resin (E), etc.) is more improved, and thus the adhesion can be more improved. Meanwhile, when the dispersibility of the elastomer (A) is insufficient, the state of mixing with other components becomes insufficient, and thus the adhesion may be insufficient. Furthermore, when the dispersibility of the latent curing agent (C) is more improved, it becomes more possible to obtain a more uniform curable composition and, moreover, it becomes possible to prevent aggregation of the latent curing agent (C), thus making it easier to mix with non-reactive components, leading to facilitation of long-term storage and transportation (e.g., export) etc. while preventing deterioration.

The production method according to the embodiment of the present invention can comprise adding the plasticizer (G) dividedly (or in divided portions) to the elastomer (A) passed through a mixing roll, in the mixing of the elastomer (A) and the plasticizer (G).

In the mixing of the elastomer (A) and the plasticizer (G), there is no particular limitation on the apparatus and method for passing the elastomer through the mixing roll, and the apparatus and method for adding the plasticizer (G) in divided portions as long as the objective curable composition of the present invention can be produced.

The production method of according to the embodiment of the invention enables more homogeneous dispersion of the elastomer (A) when the method includes adding the plasticizer (G) in divided portions to the elastomer (A) passed through the mixing roll.

The solid elastomer (A) is preferably formed (or sheeted) into a thin sheet by passing through a mixing roll. It is preferable to use the plasticizer (G) to the sheeted elastomer (A) (formed into a sheet) through the mixing roll. Softening of the elastomer (A) can be accelerated by the plasticizer (G). Usually, it is possible to pass through the mixing roll plural times.

The elastomer (A) mentioned above is suitable for sheeting which is performed by passing through a mixing roll.

The present invention can provide, as an embodiment of the method for producing a curable composition, a method for producing a curable composition comprising an elastomer (A), an epoxy resin (B) and a latent curing agent (C), the method comprising:

mixing the elastomer (A), the epoxy resin (B) and the latent curing agent (C), and (iii) mixing a part or all of components of the curable composition to obtain an intermediate mixture of the curable composition, and stirring the intermediate mixture under reduced pressure to obtain the curable composition;

wherein the stirring under reduced pressure includes stirring under reduced pressure of 3 mmHg or higher and 150 mmHg or lower for 20 minutes or more, and no stirring under reduced pressure of lower than 3 mmHg and stirring under reduced pressure of lower than 3 mmHg for 10 minutes or less.

The production method according to the embodiment of the present invention can include mixing a part or all of components of the curable composition to obtain an intermediate mixture of the curable composition, and stirring the intermediate mixture under reduced pressure. There is no particular limitation on the apparatus and the method for stirring the intermediate mixture under reduced pressure as along as the objective curable composition of the present invention can be obtained.

The intermediate mixture may be stirred under reduced pressure, i.e., the vacuum degree of, for example, 150 mmHg or lower, preferably 120 mmHg or lower, preferably 100 mmHg or lower, and more preferably 80 mmHg or lower. There is no particular limitation on the time of stirring under reduced pressure as long as air bubbles in the intermediate mixture are released and the physical properties do not deteriorate due to excessive foaming during heat curing. The stirring under reduced pressure may be performed for usually 20 minutes or more, and 20 minutes or more and 60 minutes or less.

When the intermediate mixture is stirred under reduced pressure, it is possible to exert an advantageous effect of preventing very strong foaming when the curable composition is heat-cured.

Meanwhile, the lower limit of the vacuum degree is, for example, 1 mmHg or higher, preferably 3 mmHg or higher, preferably 6 mmHg or higher, and more preferably 10 mmHg or higher. If the vacuum degree is lower than 3 mmHg, the time of stirring under reduced pressure is preferably 10 minutes or less, and more preferably 5 minutes or less, under these conditions. When the pressure is reduced to lower than 3 mmHg, the strength of the cured product of the curable composition can be improved since more air bubbles are released from the intermediate mixture. However, when an impact is applied to the cured product, the cured product may be broken at once. It is considered that small air bubbles remaining in the cured product is capable of stopping the growth of cracks when cracks occur inside the cured product.

In the case of the above (iii), the stirring under reduced pressure includes stirring under reduced pressure of preferably 6 mmHg or higher and 120 mmHg or lower for 20 minutes or more, and no stirring under reduced pressure of lower than 6 mmHg and stirring under reduced pressure of lower than 6 mmHg for 10 minutes or less.

In the case of the above (iii), the stirring under reduced pressure includes stirring under reduced pressure of more preferably 10 mmHg or higher and 100 mmHg or lower for 20 minutes or more, and no stirring under reduced pressure of lower than 10 mmHg and stirring under reduced pressure of lower than 10 mmHg for 10 minutes or less.

In the case of (iii), when the intermediate mixture includes a part of components of the curable composition, that is, the intermediate mixture does not include all components, the curable composition can be obtained by adding the remaining components of the curable components after stirring the intermediate mixture under reduced pressure. It is preferable that the remaining components of the curable composition does not substantially include a volatile substances even when stirred under reduced pressure, and examples thereof include colorants, spherical particles (glass beads and glass balloons) and the like.

In the case of including (iii), it is preferable that the latent curing agent (C) further includes a combination of two or more latent curing agents. With regard to the combination of two or more latent curing agents, it is possible to make reference to the above descriptions of the present specification, for example, melting points of at least two latent curing agents, types of the compound included, chemical structures thereof and the like. More specifically, examples of the combination of two or more latent curing agents include a combination of dicyandiamide and dodecanediohydrazide, a combination of 2-heptadecylimidazole and 2-undecylimidazole, a combination of dodecanediohydrazide and 2-heptadecylimidazole, a combination of N,N-dimethyl-N'-(3,4-dichlorophenyl)urea (diuron) and dodecanediohydrazide, a combination of dicyandiamide and 2-heptadecylimidazole and the like.

It is more preferable that the production method according to the embodiment of the present invention satisfies both features of (i) and (iii). When the production method according to the embodiment of the present invention satisfies both features of (i) and (iii), it is possible to exert an advantageous effect of exhibiting higher adhesion and shock absorbability.

The curable composition according to any one of the embodiments of the present invention can be produced using the method for producing a curable composition according to any one of the embodiments of the present invention.

The present invention can provide a method for producing a curable composition according to any one of the embodiments of the present invention, which has the feature of the curable composition according to any one of the embodiments of the present invention.

The present invention can provide a curable composition produced by the method for producing a curable composition according to any one of the embodiments of the present invention.

With respect to the curable composition of the embodiments herein and the method for producing the same, it is possible to combine the respective features, the contents of the embodiments and the like as much as possible. Therefore, in order to avoid redundancy, the description of detailed combination of features is omitted.

The curable composition according to the embodiment of the present invention is preferably excellent in aluminum alloy plate adhesion (cured at 150° C.) (shear strength), aluminum alloy plate adhesion (cured at 165° C.) (shear strength), aluminum alloy plate adhesion (cured at 150° C.) (shear strength) after storage at 50° C. for 5 days, elongation of the cured product (cured at 165° C.), steel plate adhesion (cured at 165° C.) (shear strength) and (peel strength), impact strength of the cured product, storage stability of the curable composition, and anti-sagging property of the curable composition. The detailed evaluation methods are mentioned in Examples.

The curable composition according to the present embodiment can be applied to a place to be needed in any thickness and any application form using known coating methods such as bead coating, slit coating, spray coating, swirl coating and shot coating methods, and can be cured by heating to a predetermined temperature using, for example, a hot air circulation drying oven.

In the embodiment of the present invention, it is possible to provide a method for producing a motor vehicle, which comprises using the curable composition according to the embodiment of the present invention.

The curable composition according to the embodiment of the invention can be used in body shop processes for producing motor vehicles. More specifically, it is possible to suitably use as adhesives for body shop processes (e.g., structural adhesives, anti-flatter adhesives, etc.).

In the above coating means, the coating can also be performed by a computer-controlled automatic coating machine or a robot coating machine.

The present invention provides, in a further aspect, a method for reducing a curing temperature of a curable composition, which comprises using the above curable composition.

EXAMPLES

The present invention will be described below by way of Examples and Comparative Examples. However, these Examples are merely embodiments of the present invention and the present invention is in no way limited by these Examples. In the description of Examples, unless otherwise specified, parts by weight and percentages by weight are based on portions in which a solvent is not taken into account.

Components used in the present Examples are shown below.

(A) Elastomer
(a1) Styrene-butadiene rubber (SBR1009 (trade name) manufactured by ISP Japan, Ltd.)
(a2) Butadiene rubber (BR1220 (trade name) manufactured by Zeon Corporation)

(B) Epoxy resin
(b1) Bisphenol A type epoxy resin (JER828 (trade name) manufactured by Mitsubishi Chemical Corporation)
(b2) Urethane-modified epoxy resin (EPU-78-11 (trade name) manufactured by ADEKA CORPORATION) (A part of the epoxy resin is modified with a urethane elastomer in advance, including (A). The urethane elastomer modification amount is 10 to 20% by mass)
(b3) Hydrogenated bisphenol A type epoxy resin (HBE-100 (trade name) manufactured by New Japan Chemical Co., Ltd.)
(b4) Polypropylene glycol diglycidyl ether (ADEKA GLYCYLOL ED-506 (trade name) manufactured by ADEKA CORPORATION)

(C) Latent curing (accelerating) agent
(c1) Dicyandiamide (CG-NA (trade name) manufactured by Air Products Limited), melting point of 207 to 210° C., average particle size of 30 μm or more
(c2) 2-Heptadecylimidazole, melting point of 88° C., average particle size of 30 μm or more
(c3) 2-Undecylimidazole, melting point of 72° C., average particle size of 30 μm or more
(c4) 2,4-diamino-6-(2'-methylimidazolyl-(1'))-ethyl-o-triazine (2MZA (trade name) manufactured by SHIKOKU CHEMICALS CORPORATION), melting point of 248 to 258° C., average particle size of 25 μm or less
(c5) N,N-dimethyl-N'-(3,4-dichlorophenyl)urea (diuron) (Dyhard UR200 (trade name) manufactured by AlzChem), melting point of 172 to 182° C., average particle size of 25 μm
(c6) Dodecanedihydrazide (DDH (trade name) manufactured by Otsuka Chemical Co., Ltd.), melting point of 188 to 192° C., average particle size of 25 μm or less (D) Filler
(d1) Surface-treated calcium carbonate (HAKUENKA CCR (trade name) manufactured by Shiraishi Kogyo Kaisha, Ltd.)
(d2) Heavy calcium carbonate (BF200 (trade name) manufactured by BIHOKU FUNKA KOGYO CO., LTD.)
(d3) Crown Clay (Crown Clay (trade name) manufactured by Shiraishi Calcium Kaisha, Ltd.)
(d4) Hydrophobic silica (TS720 (trade name) manufactured by Cabot Specialty Chemicals Inc.)

(E) Thermoplastic resin
(e1) Acrylic resin (LP-3102 (trade name) manufactured by MITSUBISHI RAYON CO., LTD.), average particle size of 50 μm
(e2) Polymethacrylic acid ester-based resin (ZEFIAC F351 (trade name) manufactured by Aica Kogyo Company, Limited), average particle size of 80 μm
(e3) Vinyl chloride resin (PSH-10 (trade name) manufactured by KANEKA CORPORATION), average particle size of 1 μm (F) Crosslinking agent for elastomers
(f1) n-Butyl 4,4-di(t-butylperoxy)valerate (PERHEXA V (trade name) manufactured by NOF CORPORATION)

(G) Plasticizer
(g1) Diisononyl phthalate (H) Others
(h1) 3-Mercaptopropyltrimethoxysilane (KBM803 (trade name) manufactured by Shin-Etsu Chemical Co., Ltd.)
(h2) Calcium oxide (QCX (trade name) manufactured by Inoue Calcium Corporation)
(h3) Hydrocarbon-based solvent (ISOPAR H (trade name) manufactured by Exxon Mobil Corporation)

Average Particle Size

The latent curing agent (C) was ground using a KJ400 (trade name) manufactured by Kurimoto, Ltd. The average particle size of the ground latent curing agent can be measured by laser particle size distribution measurement method using SALD-200V ER (trade name) manufactured by Shimadzu Corporation. The average particle size thus obtained were mentioned above.

These components were mixed in each proportion shown in Tables 1 and 2 to produce curable compositions of Examples 1 to 14 and Comparative Examples 1 to 3.

More specifically, the curable compositions of Examples 1 to 12 and Comparative Examples 1 to 2 were produced in the following manner.

The elastomer (A) was sheeted by a mixing roll and the sheeted elastomer (A) was charged in a pressurizing kneader. The epoxy resin (B) or the plasticizer (G) and calcium carbonate were added little by little, followed by stirring and kneading to dissolve the elastomer (A). The mixture containing the elastomer (A) was mixed and stirred together with other components such as the epoxy resin (B) and the latent curing agent (C) using a planetary mixer to produce the curable composition.

Furthermore, if necessary, the followings were performed in the method for producing the curable compositions of Examples 1 to 12 and Comparative Examples 1 to 2.

The latent curing agent (C) was used after mixing with a part of the plasticizer (G) (in a mass ratio of 1:1) in advance. In other words, the latent curing agent (C) was used after dispersing in the plasticizer (G).

In the method for producing the curable compositions of Examples 1 to 12 and Comparative Examples 1 to 2, the mixture obtained by mixing all of the components was stirred under reduced pressure of 10 mmHg or higher and 100 mmHg or lower for 20 minutes or more and 60 minutes or less to obtain the objective curable composition.

The curable compositions of Examples 13 to 16 and Comparative Example 3 were produced as follows.

Since (b2) containing the elastomer (A) component was used and the elastomer (A) component was not used alone, the epoxy resin (containing (b2) which contains the elastomer), the latent curing agent (C) and other components were mixed and stirred using a planetary mixer to produce the curable composition.

Furthermore, if necessary, the followings were performed in the method for producing the curable compositions of Examples 13 to 16.

The latent curing agent (C) was mixed with a part of the filler (D) (in the same amount as that of the latent curing agent (C)) and then used after grinding using a grinder so that the average particle diameter became 10 μm or less. In other words, the latent curing agent (C) was used after mixed with a part of the filler (D) and grinding so that the average particle diameter became 10 μm or less.

In the method for producing the curable composition of Example 13, the mixture obtained by mixing all the components was stirred under reduced pressure of 60 mmHg or lower for 30 minutes (during which the stirring was performed under reduced pressure of lower than 10 mmHg for 12 minutes, and the maximum pressure reduction was 4 mmHg) to obtain the objective curable composition.

In the method for producing the curable composition of Example 14, the mixture obtained by mixing all the components was stirred under reduced pressure of 60 mmHg or lower for 30 minutes (during which the stirring time under reduced pressure of lower than 10 mmHg was 0 minute, and the maximum vacuum degree was 15 mmHg) to obtain the objective curable composition.

In the method for producing the curable composition of Example 15, the mixture obtained by mixing all the components was stirred under reduced pressure of 60 mmHg or lower for 30 minutes (during which the stirring time under reduced pressure of lower than 10 mmHg was 0 minute, and the maximum vacuum degree was 15 mmHg) to obtain the desired curable composition.

In the method for producing the curable compositions of Example 16 and Comparative Example 3, the mixture obtained by mixing all the components was stirred under reduced pressure of less than 60 mmHg or lower for 60 minutes (during which the stirring time under reduced pressure of lower than 3 mmHg was 20 minutes, and the maximum vacuum degree was 0.5 mmHg) to obtain the desired curable composition.

With respect to each of the above curable compositions, aluminum alloy plate adhesion (cured at 150° C.) (shear strength), aluminum alloy plate adhesion (cured at 165° C.) (shear strength), aluminum alloy plate adhesion (cured at 150° C.) (shear strength) after storage at 50° C. for 5 days, elongation of the cured product (cured at 165° C.), steel plate adhesion (cured at 165° C.) (shear strength) and (peel strength), impact strength of the cured product, storage stability of the curable composition, volume change rate (%) of the curable composition and anti-sagging property of the curable composition were measured by the following methods and evaluated. The results are shown in Tables 1 and 2.

Aluminum Alloy Plate Adhesion (Cured at 150° C. (Low Temperature))

A surface of an aluminum alloy plate (1.0×25×100 mm) mentioned in JIS A5182 was degreased with white gasoline. A curable composition was applied to the surface of the aluminum alloy plate. Thereafter, a steel plate mentioned in JIS G3141 whose surface was degreased in the same manner was stacked and the thickness of the curable composition was adjusted to 3 mm using a spacer. The curable composition was cured under the condition at 150° C. for 30 minutes to obtain a sample. Using an autograph (Shimadzu Corporation, DSC-5000), the shear strength (kPa) was measured as the aluminum alloy plate adhesion (cured at 150° C. (low temperature)) at a tensile speed of 50 mm/minute in accordance with JASO M323-77 (shear strength test method).

Furthermore, the fracture state of the cured product of the curable composition was visually observed. The evaluation criteria of the fracture state are as follows. The shear strength (kPa) and the fracture state are shown in Tables 1 to 2.
- A: Interface fracture (less than 10%)/cohesive fracture (90% or more)
- B: Interface fracture (10% or more and less than 30%)/cohesive fracture (70% or more and less than 90%)
- C: Interface fracture (30% or more and less than 50%)/cohesive fracture (50% or more and less than 70%)
- D: Interface fracture (50% or more and less than 70%)/cohesive fracture (30% or more and less than 50%)
- E: Interface fracture (70% or more)

Aluminum Alloy Plate Adhesion (Cured at 165° C. (Standard))

A surface of an aluminum alloy plate (1.0×25×100 mm) mentioned in JIS A5182 was degreased with white gasoline. A curable composition was applied to the surface of the aluminum alloy plate. Thereafter, a steel plate mentioned in JIS G3141 whose surface was degreased in the same manner was stacked and the thickness of the curable composition was adjusted to 3 mm using a spacer. The curable composition was cured under the condition at 165° C. for 30 minutes to obtain a sample. Using an autograph (Shimadzu Corporation, DSC-5000), the shear strength (kPa) was measured as the aluminum alloy plate adhesion (cured at 165° C. (standard)) at a tensile speed of 50 mm/minute in accordance with JASO M323-77 (shear strength test method).

Furthermore, the fracture state of the cured product of the curable composition was visually observed. The evaluation criteria of the fracture state are as follows. The shear strength (kPa) and the fracture state are shown in Tables 1 to 2.
- A: Interface fracture (less than 10%)/cohesive fracture (90% or more)
- B: Interface fracture (10% or more and less than 30%)/cohesive fracture (70% or more and less than 90%)
- C: Interface fracture (30% or more and less than 50%)/cohesive fracture (50% or more and less than 70%)
- D: Interface fracture (50% or more and less than 70%)/cohesive fracture (30% or more and less than 50%)
- E: Interface fracture (70% or more)

Aluminum Alloy Plate Adhesion after Storage at 50° C. for 5 Days (Cured at 150° C. (Low Temperature))

The shear strength (kPa) was measured and the fracture state of the cured product was evaluated using the same method as mentioned for the above aluminum alloy plate adhesion (cured at 150° C. (low temperature)), except that the curable composition was used after storage at 50° C. for 5 days. The results are shown in Tables 1 to 2.

Elongation of Cured Product (Cured at 165° C.)

Elongation was measured in accordance with JIS K6251 "Tensile Test". A curable composition produced as mentioned above was applied in a form of a sheet having a thickness of 3 mm, and then baked under a predetermined condition (at 165° C. for 30 minutes). After baking, the sheet was punched out into a shape of a dumbbell shape No. 2 to obtain a test sample. An elongation percentage at break measured at a tensile speed of 50 mm/minute was recorded as the elongation.

Hardness was measured as follows.

The above cured product were stacked so that the thickness became about 12 mm, and then the hardness was measured in accordance with JIS K6253 using a TYPE A hardness tester.

Steel Plate Adhesion (Cured at 165° C. (Standard)) (Shear Strength)

A surface of a steel plate (1.6×25×100 mm) mentioned in JIS G3141 was degreased with white gasoline. A curable composition was applied to the surface of the steel plate. Thereafter, a steel plate mentioned in JIS G3141 whose surface was degreased in the same manner was stacked, followed by pressing and further curing of the curable composition at 165° C. for 30 minutes to obtain a sample. Using an autograph (Shimadzu Corporation, DSC-5000), the shear strength (kPa) was measured as the steel plate adhesion (cured at 165° C. (standard)) at a tensile speed of 50 mm/minute in accordance with JASO M353 (shear strength test method).

Furthermore, the fracture state of the cured product was visually observed. The evaluation criteria of the fracture state are as follows. The shear strength (kPa) and the fracture state are shown in Tables 1 to 2.

A: Interface fracture (less than 10%)/cohesive fracture (90% or more)
B: Interface fracture (10% or more and less than 70%)/cohesive fracture (30% or more and less than 90%)
C: Interface fracture (90% or more)

Steel Plate Adhesion (Cured at 165° C. (Standard)) (Peel Strength)

A surface of a steel plate (0.8×25×150 mm) mentioned in JIS G3141 was degreased with toluene. A curable composition was applied to the surface of the steel plate. Thereafter, a steel plate mentioned in JIS G3141 whose surface was degreased in the same manner was stacked, followed by pressing and further curing under a condition of at 165° C. for 30 minutes to obtain a sample. Using an autograph (Shimadzu Corporation, DSC-5000), the 180° peel strength (N/25 mm) was measured at a tensile speed of 200 mm/minute in accordance with JASO M353 (peel strength test method).

Furthermore, the fracture state of the cured product was visually observed. The evaluation criteria of the fracture state are as follows. The 180° peel strength (N/25 mm) and the fracture state are shown in Tables 1 to 2.

A: Interface fracture (less than 10%)/cohesive fracture (90% or more)
B: Interface fracture (10% or more and less than 70%)/cohesive fracture (30% or more and less than 90%)
C: Interface fracture (90% or more)

Impact Strength of Cured Product (Cured at 165° C. (Standard))

Using a steel plate mentioned in JIS G3141, a curable composition was cured under a condition of at 165° C. for 30 minutes in accordance with a wedge impact test mentioned in JIS K6865 to fabricate a specimen. Using a high-speed tensile testing machine, an impact test was performed. The test speed was 2 m/second. An average strength in a range of 25 to 90% of the total displacement during the test was divided by the width of the specimen to obtain the impact strength (N/mm).

Storage Stability of Curable Composition (at 40° C. for 14 Days)

Storage stability of a curable composition was evaluated by storing at 40° C. for 14 days and measuring a change in viscosity during the storage. Specifically, the evaluation was performed as follows.

A 250 cc bottle having a depth of 13 cm was filled with a curable composition, and then viscosity was measured by a rotational viscometer in accordance with JIS K6833. The viscosity was measured using a rotor No. 7 at 2 rpm. The temperature of the material during measurement was 20° C. The viscosity ($\eta^1$) of the curable composition stored at 20° C. for 1 day after production and the viscosity ($\eta^{14}$) stored furthermore at 40° C. for 14 days were measured. Using the viscosity ($\eta^1$) of the curable composition stored at 20° C. for 1 day after production as a standard, a rate of increase in viscosity ($\eta^{14}$) of the curable composition after further storage at 40° C. for 14 days (i.e. viscosity increase rate) was determined.

Viscosity increase rate (%)=$\eta^{14}/\eta^1 \times 100-100$

The evaluation criteria are as follows
A: Viscosity increase rate of less than 30%
B: Viscosity increase rate of 30% or more and less than 40%
C: Viscosity increase rate of 40% or more and less than 60%
D: Viscosity increase rate of 60% or more Volume Change Rate (%) of Curable Composition Volume change rate (%) of a curable composition was evaluated in accordance with the volume change rate test A method mentioned in 9.34 of JASO M323-86.

Anti-Sagging Property of Curable Composition

Anti-sagging property of a curable composition was evaluated in accordance with a fluidity test method mentioned in JASO M323-86 9.10. Specifically, the anti-sagging property was evaluated as follows.

A curable composition stored at 20° C. for 1 day after production was applied to a steel plate (100 mm in width, 300 mm in length and 0.8 mm in thickness) using a formwork in a reverse L shape measuring 50 mm in width, 100 mm length, 10 mm line width and 5 mm thickness. After removing the formwork, the steel plate was mounted to a holding fixture at an angle of 90° and the flow was measured after 10 minutes. The flow was then measured after heating at 165° C. for 20 minutes.

The evaluation criteria were as follows
A: Total flow length of less than 10 mm
B: Total flow length of 10 mm or more and less than 20 mm
C: Total flow length of 20 mm or more

TABLE 1

|  |  | Example | | | | | | | | |
|---|---|---|---|---|---|---|---|---|---|---|
|  |  | 1 | 2 | 3 | 4 | 5 | 6 | 7 | 8 | 9 |
| (A) | (a1) | 5.6 | 5.6 | 5.6 | 5.6 | 5.6 | 5.6 | 5.6 | 5.6 | 5.6 |
|  | (a2) | 1.8 | 1.8 | 1.8 | 1.8 | 1.8 | 1.8 | 1.8 | 1.8 | 1.8 |
| (B) | (b1) | 2.0 |  |  | 2.0 | 2.0 | 2.0 | 2.0 | 2.0 | 2.0 |
|  | (b2) |  | 2.0 |  |  |  |  |  |  |  |
|  | (b3) |  |  | 2.0 |  |  |  |  |  |  |
|  | (b4) |  |  |  |  |  |  |  |  |  |
| (C) | (c1) | 0.3 | 0.3 | 0.3 | 0.3 | 0.3 | 0.3 | 0.3 | 0.3 | 0.3 |
|  | (c2) | 0.1 | 0.1 | 0.1 | 0.1 | 0.1 | 0.1 |  | 0.3 | 0.1 |
|  | (c3) |  |  |  |  | 0.01 | 0.01 |  |  |  |
|  | (c4) |  |  |  | 0.4 |  | 0.4 | 0.3 |  |  |
|  | (c5) |  |  |  |  |  |  |  |  |  |
|  | (c6) | 0.4 | 0.4 | 0.4 |  | 0.4 |  | 0.4 | 0.2 | 0.4 |
| (D) | (d1) | 7.9 | 7.9 | 7.9 | 7.9 | 7.9 | 7.9 | 7.9 | 7.9 | 7.9 |
|  | (d2) | 40.0 | 40.0 | 40.0 | 40.0 | 40.0 | 40.0 | 40.0 | 40.0 | 40.0 |
|  | (d3) | 1.5 | 1.5 | 1.5 | 1.5 | 1.5 | 1.5 | 1.5 | 1.5 | 1.5 |
|  | (d4) |  |  |  |  |  |  |  |  |  |
| (E) | (e1) | 6.0 | 6.0 | 6.0 | 6.0 | 6.0 | 6.0 | 6.0 | 10.0 | 2.0 |
|  | (e2) |  |  |  |  |  |  |  |  |  |
|  | (e3) |  |  |  |  |  |  |  |  | 4.0 |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| (F) | (f1) | 0.1 | 0.1 | 0.1 | 0.1 | 0.1 | 0.1 | 0.1 | 0.1 | 0.1 |
| (G) | (g1) | 30.8 | 30.8 | 30.8 | 30.8 | 30.8 | 30.8 | 30.8 | 30.8 | 30.8 |
| (H) | (h1) | 0.1 | 0.1 | 0.1 | 0.1 | 0.1 | 0.1 | 0.1 | 0.1 | 0.1 |
| | (h2) | 1.3 | 1.3 | 1.3 | 1.3 | 1.3 | 1.3 | 1.3 | 1.3 | 1.3 |
| | (h3) | 3.0 | 3.0 | 3.0 | 3.0 | 3.0 | 3.0 | 3.0 | 3.0 | 3.0 |
| | | 100.8 | 100.8 | 100.8 | 100.8 | 100.8 | 100.8 | 101.0 | 104.8 | 100.8 |
| Aluminum alloy plate adhesion | | | | | | | | | | |
| a) | Shear strength kPa | 488 | 502 | 460 | 441 | 520 | 450 | 481 | 785 | 530 |
| | Fracture state | A | A | A | B | A | B | B | A | B |
| b) | Shear strength kPa | 646 | 655 | 663 | 636 | 660 | 653 | 630 | 823 | 785 |
| | Fracture state | A | A | A | A | A | A | A | A | A |
| c) | Shear strength kPa | 485 | 499 | 457 | 380 | 503 | 395 | 375 | 683 | 320 |
| | Fracture state | A | A | A | B | A | B | B | A | C |
| | Elongation at break % | 150 | 160 | 150 | 193 | 150 | 180 | 148 | 143 | 173 |
| | Hardness | 19 | 19 | 18 | 20 | 18 | 21 | 14 | 26 | 18 |
| Steel plate adhesion | | | | | | | | | | |
| b) | Shear strength MPa | — | — | — | — | — | — | — | — | — |
| | Fracture state | | | | | | | | | |
| b) | Peel strength N/25 mm | — | — | — | — | — | — | — | — | — |
| | Fracture state | | | | | | | | | |
| | Impact strength N/mm | — | — | — | — | — | — | — | — | — |
| | Storage stability | A | A | A | C | B | C | A | C | A |
| | Volume change rate (%) | 97 | 97 | 97 | 97 | 97 | 97 | 97 | 97 | 97 |
| | Anti-sagging property | A | A | A | A | A | A | A | A | A | a) cured at 150° C.
b) cured at 165° C.
c) cured at 150° C. after storage at 50° C. for 5 days

TABLE 2

| | | Example | | | | | | | Comparative Example | | |
|---|---|---|---|---|---|---|---|---|---|---|---|
| | | 10 | 11 | 12 | 13 | 14 | 15 | 16 | 1 | 2 | 3 |
| (A) | (a1) | 5.6 | 5.6 | 5.6 | | | | | 5.6 | 5.6 | |
| | (a2) | 1.8 | 1.8 | 1.8 | | | | | 1.8 | 1.8 | |
| (B) | (b1) | 2.0 | 2.0 | 2.0 | 30.0 | 30.0 | 30.0 | 30.0 | 2.0 | 2.0 | 30.0 |
| | (b2) | | | | 20.0 | 20.0 | 20.0 | 20.0 | | | 20.0 |
| | (b3) | | | | | | | | | | |
| | (b4) | | | | 5.0 | 5.0 | 5.0 | 5.0 | | | 5.0 |
| (C) | (c1) | 0.3 | 0.3 | 0.3 | 3.0 | 3.0 | 3.0 | 3.0 | 1.0 | | 3.0 |
| | (c2) | 0.1 | 0.1 | 0.3 | 0.1 | 0.1 | 0.1 | 0.1 | | 0.8 | |
| | (c3) | | | | | | | | | | |
| | (c4) | | | | | | | | | | |
| | (c5) | | | | 1.0 | 1.0 | 1.0 | 1.0 | | | |
| | (c6) | 0.4 | 0.4 | 0.4 | | | | | | | |
| (D) | (d1) | 7.9 | 7.9 | 7.9 | 5.0 | 5.0 | 5.0 | 5.0 | 7.9 | 7.9 | 5.0 |
| | (d2) | 40.0 | 40.0 | 40.0 | 25.0 | 25.0 | 25.0 | 25.0 | 40.0 | 40.0 | 25.0 |
| | (d3) | 1.5 | 1.5 | 1.5 | 3.0 | 3.0 | 3.0 | 3.0 | 1.5 | 1.5 | 3.0 |
| | (d4) | | | | 3.5 | 3.5 | 3.5 | 3.5 | | | 3.5 |
| (E) | (e1) | | 2.0 | 6.0 | | | | | | 6.0 | |
| | (e2) | 6.0 | | | 2.0 | 2.0 | 2.0 | 2.0 | | | 2.0 |
| | (e3) | | | | | | | | | | |
| (F) | (f1) | 0.1 | 0.1 | 0.8 | | | | | 0.1 | 0.1 | |
| (G) | (g1) | 30.8 | 30.8 | 30.8 | | | | | 30.8 | 30.8 | |
| (H) | (h1) | 0.1 | 0.1 | | | | | | 0.1 | 0.1 | |
| | (h2) | 1.3 | 1.3 | 1.3 | 2.0 | 2.0 | 2.0 | 2.0 | 1.3 | 1.3 | 2.0 |
| | (h3) | 3.0 | 3.0 | 3.0 | | | | | 3.0 | 3.0 | |
| | | 100.8 | 96.8 | 101.6 | 99.6 | 99.6 | 99.6 | 99.6 | 101.0 | 100.8 | 98.5 |
| Aluminum alloy plate adhesion | | | | | | | | | | | |
| a) | Shear strength kPa | 410 | 150 | 365 | — | — | — | — | 130 | 490 | — |
| | Fracture state | A | A | A | | | | | E | A | |
| b) | Shear strength kPa | 645 | 350 | 423 | — | — | — | — | 520 | 620 | — |
| | Fracture state | A | A | A | | | | | A | A | |
| c) | Shear strength kPa | 460 | 80 | 237 | — | — | — | — | 120 | 370 | — |
| | Fracture state | A | D | A | | | | | E | D | |

TABLE 2-continued

|  | | Example | | | | | | | Comparative Example | | |
|---|---|---|---|---|---|---|---|---|---|---|---|
|  | | 10 | 11 | 12 | 13 | 14 | 15 | 16 | 1 | 2 | 3 |
|  | Elongation at break % | 145 | 120 | 150 | — | — | — | — | 140 | 150 | — |
|  | Hardness | 20 | 11 | 18 | | | | | 17 | 21 | |
|  | Steel plate adhesion | | | | | | | | | | |
| b) | Shear strength MPa | — | — | — | 25.4 | 24.8 | 23.5 | 26.8 | — | — | 22.0 |
|  | Fracture state | | | | A | A | A | A | | | A |
| b) | Peel strength N/25 mm | — | — | — | 160 | 165 | 158 | 155 | — | — | 120 |
|  | Fracture state | | | | A | A | A | A | | | A |
|  | Impact strength N/mm | — | — | — | 13 | 15 | 13 | 10 | — | — | 7 |
|  | Storage stability | A | A | C | A | A | A | A | A | D | A |
|  | Volume change rate | 97 | 97 | 97 | — | — | — | — | 97 | 97 | — |
|  | Anti-sagging property | A | A | A | A | A | A | A | A | A | A | a) cured at 150° C.
b) cured at 165° C.
c) cured at 150° C. after storage at 50° C. for 5 days The curable compositions of Examples 1 to 16 were excellent in all of aluminum alloy plate adhesion (cured at 150° C., cured at 165° C., cured at 150° C. after storage at 50° C. for 5 days), elongation at break (cured at 165° C.), hardness, steel plate adhesion (cured at 165° C.) (shear strength and peel strength), impact strength, storage stability, volume change rate and anti-sagging property.

The curable compositions of Comparative Examples 1 to 3 were inferior in any one of the above properties.

The curable composition according to the embodiment of the present invention comprises an elastomer (A), an epoxy resin (B) and a latent curing agent (C), the latent curing agent (C) comprising a combination of two or more latent curing agents, and the curable composition can be suitably used in applications of adhesives for motor vehicles, and more specifically adhesives for body shop processes. The curable composition can be suitably used, for example, in adhesives for motor vehicles, and more specifically adhesives for body shop processes (e.g., structural adhesives, anti-flatter adhesives, etc.).

What is claimed is:

1. An adhesive composition comprising:
an elastomer (A), an epoxy resin (B), and a latent curing agent (C), a filler (D), a thermoplastic resin (E), a crosslinking agent (F) for elastomers, and a plasticizer (G), wherein
the latent curing agent (C) comprises a combination of two or more latent curing agents,
at least one comprised in the latent curing agent (C) comprises an imidazole compound having a C10-C23 aliphatic alkane structure,
at least one comprised in the latent curing agent (C) comprises a dihydrazide compound having a C10-C23 aliphatic alkylene structure,
the adhesive composition includes the epoxy resin (B) in an amount of 0.2 parts by mass or more and 10 parts by mass or less based on 100 parts by mass of the curable composition, and
the melting points of at least two latent curing agents comprised in the latent curing agent (C) differ by a range of 10° C. to 80° C.

2. The adhesive composition according to claim 1, wherein at least one comprised in the latent curing agent (C) comprises a latent curing agent satisfying the formula (1):

[Chemical Formula 1]

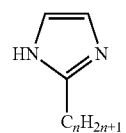

(1)

[wherein, in the formula (1), n=10 to 23].

3. The adhesive composition according to claim 1, wherein at least one comprised in the latent curing agent (C) comprises dodecanediohydrazide.

4. The adhesive composition according to claim 1, wherein the elastomer (A) comprises at least one selected from a styrene-butadiene copolymer, a nitrile-butadiene copolymer, a butadiene polymer, an isoprene polymer, an ethylene-propylene-diene rubber, an acrylic and a urethane.

5. The adhesive composition according to claim 1, wherein the thermoplastic resin (E) comprises at least one selected from an acrylic resin, a PVC resin, a vinyl acetate resin and copolymers thereof.

6. The adhesive composition according to claim 1, wherein the crosslinking agent (F) for elastomers comprises at least one selected from sulfur and a peroxide.

7. A motor vehicle adhesive comprising the adhesive composition according to claim 1.

8. A body shop adhesive for producing motor vehicles comprising the adhesive composition according to claim 1.

* * * * *

UNITED STATES PATENT AND TRADEMARK OFFICE
CERTIFICATE OF CORRECTION

| | | |
|---|---|---|
| PATENT NO. | : 11,920,028 B2 | Page 1 of 1 |
| APPLICATION NO. | : 17/751337 | |
| DATED | : March 5, 2024 | |
| INVENTOR(S) | : Toshio Kobayashi and Takaaki Inoue | |

It is certified that error appears in the above-identified patent and that said Letters Patent is hereby corrected as shown below:

On the Title Page

The Item (30) "Foreign Application Priority Data" section of the patent should also list PCT/JP2021/019812 as a priority document with a priority filing date of May 25, 2021.

Signed and Sealed this
Fifteenth Day of October, 2024

Katherine Kelly Vidal
*Director of the United States Patent and Trademark Office*